United States Patent
Shepelev et al.

(10) Patent No.: US 9,870,105 B2
(45) Date of Patent: Jan. 16, 2018

(54) FAR-FIELD SENSING WITH A DISPLAY DEVICE HAVING AN INTEGRATED SENSING DEVICE

(71) Applicant: Synaptics Incorporated, San Jose, CA (US)

(72) Inventors: Petr Shepelev, San Jose, CA (US); Adam Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 489 days.

(21) Appl. No.: 14/040,589

(22) Filed: Sep. 27, 2013

(65) Prior Publication Data

US 2015/0091840 A1    Apr. 2, 2015

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| 7,541,816 B1* | 6/2009 | Liao et al. ............. 324/676 |
| 8,054,300 B2 | 11/2011 | Bernstein | |
| 2008/0158172 A1 | 7/2008 | Hotelling | |
| 2008/0309631 A1 | 12/2008 | Westerman | |
| 2010/0026656 A1 | 2/2010 | Hotelling | |
| 2010/0292945 A1 | 11/2010 | Reynolds | |
| 2011/0007021 A1 | 1/2011 | Bernstein | |
| 2011/0148436 A1 | 6/2011 | Dattalo | |
| 2012/0038586 A1* | 2/2012 | Han et al. ............. 345/174 |
| 2012/0313881 A1* | 12/2012 | Ge et al. ............... 345/174 |
| 2013/0207924 A1* | 8/2013 | Mohindra et al. ..... 345/174 |

* cited by examiner

*Primary Examiner* — Duane N Taylor, Jr.
(74) *Attorney, Agent, or Firm* — Patterson + Sheridan, LLP

(57) ABSTRACT

Embodiments of the present invention generally provide an input device comprising a display device integrated with a capacitive sensing device. The input device includes a plurality of transmitter electrodes, each transmitter electrode comprising one or more common electrodes configured to be driven for display updating and capacitive sensing, a plurality of near-field receiver electrodes configured to perform capacitive sensing in a near-field sensing region, and a plurality of far-field receiver electrodes configured to perform capacitive sensing in a far-field sensing region. The input device further includes a processing system coupled to the plurality of transmitter electrodes, the plurality of near-field receiver electrodes, and the plurality of far-field receiver electrodes. The processing system is configured to determine a near-field capacitive image based on the first resulting signals received from the near-field receiver electrodes and determine a far-field capacitive image based on the second resulting signals received from the far-field receiver electrodes.

23 Claims, 5 Drawing Sheets

FAR-FIELD SENSING WITH A DISPLAY DEVICE HAVING AN INTEGRATED SENSING DEVICE

DESCRIPTION OF THE RELATED ART

Input devices including proximity sensor devices (also commonly called touchpads or touch sensor devices) are widely used in a variety of electronic systems. A proximity sensor device typically includes a sensing region, often demarcated by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices may include one or more types of electrodes configured for both updating display lines and transmitting input sensing signals. In such shared electrode configurations, sensor electrodes typically are configured to detect the presence of an input object that is in contact with the surface of the input device. However, by configuring the geometry and/or placement of the electrodes for touch sensing, the electrodes typically are not capable of accurately sensing input objects that are more than a few millimeters above the input surface. Consequently, such devices cannot perform both touch sensing and proximity sensing in a reliable manner.

Therefore, there is a need for a system and method for performing both touch sensing and proximity sensing in shared electrode devices.

SUMMARY OF THE INVENTION

Embodiments of the present invention generally provide an input device comprising a display device integrated with a capacitive sensing device. The input device includes a plurality of transmitter electrodes, a plurality of near-field receiver electrodes, a plurality of far-field receiver electrodes, and a processing system coupled to the plurality of transmitter electrodes, the plurality of near-field receiver electrodes, and the plurality of far-field receiver electrodes. Each transmitter electrode includes one or more common electrodes configured to be driven for display updating and capacitive sensing. The plurality of near-field receiver electrodes is configured to perform capacitive sensing in a near-field sensing region disposed between an input surface of the input device and a far-field sensing region. The plurality of far-field receiver electrodes is configured to perform capacitive sensing in the far-field sensing region. A geometric property of a far-field receiver electrode included in the plurality of far-field receiver electrodes is different than the geometric property of a near-field receiver electrode included in the plurality of near-field receiver electrodes. The processing system is configured to drive the plurality of transmitter electrodes for capacitive sensing, receive first resulting signals with the plurality of near-field receiver electrodes when the plurality of transmitter electrodes are driven for capacitive sensing, determine a near-field capacitive image based on the first resulting signals, receive second resulting signals with the plurality of far-field receiver electrodes when the plurality of transmitter electrodes are driven for capacitive sensing, and determine a far-field capacitive image based on the second resulting signals.

Embodiments of the present invention further provide a processing system for a display device integrated with a capacitive sensing device. The processing system includes a driver module, a receiver module, and a determination module. The driver module includes driver circuitry and is coupled to a plurality of common electrodes configured to be driven for display updating and capacitive sensing. The receiver module is coupled to a plurality of near-field receiver electrodes and a plurality of far-field receiver electrodes. A geometric property of a far-field receiver electrode included in the plurality of far-field receiver electrodes is different than the geometric property of a near-field receiver electrode included in the plurality of near-field receiver electrodes. The receiver module is configured for receiving first resulting signals with the plurality of near-field receiver electrodes when the plurality of common electrodes are driven for capacitive sensing. The plurality of near-field receiver electrodes are configured for performing capacitive sensing in a near-field sensing region disposed between an input surface of the capacitive sensing device and a far-field sensing region. The receiver module is further configured for receiving second resulting signals with the plurality of far-field receiver electrodes when the plurality of common electrodes are driven for capacitive sensing. The plurality of far-field receiver electrodes are configured for performing capacitive sensing in the far-field sensing region. The determination module is configured for determining a near-field capacitive image based on the first resulting signals, and determining a far-field capacitive image based on the second resulting signals.

Embodiments of the present invention further provide a method of capacitive sensing with a display device integrated with a capacitive sensing device having a plurality of common electrodes, a plurality of near-field receiver electrodes, and a plurality of far-field receiver electrodes. A geometric property of a far-field receiver electrode included in the plurality of far-field receiver electrodes is different than the geometric property of a near-field receiver electrode included in the plurality of near-field receiver electrodes. The method includes driving the plurality of common electrodes for display updating and capacitive sensing, and receiving first resulting signals with the plurality of near-field receiver electrodes when the plurality of common electrodes are driven for capacitive sensing. The plurality of near-field receiver electrodes is configured to perform capacitive sensing in a near-field sensing region disposed between an input surface of the input device and a far-field sensing region. The method further includes determining a near-field capacitive image based on the first resulting signals and receiving second resulting signals with the plurality of far-field receiver electrodes when the plurality of common electrodes are driven for capacitive sensing. The plurality of far-field receiver electrodes is configured to perform capacitive sensing in the far-field sensing region. The method further includes determining a far-field capacitive image based on the second resulting signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for performing capacitive sensing in a far-field sensing region and in a near-field sensing region disposed between the far-field sensing region and a surface of an input device. Near-field sensing may be performed using a plurality of near-field receiver electrodes. Far-field sensing may be performed using a plurality of far-field receiver electrodes, where one or more geometry properties (e.g., width and/or surface area) of the far-field receiver electrodes are different than the near-field receiver electrodes. Advantageously, by including both near-field receiver electrodes and far-field receiver electrodes in an input device, accurate touch sensing and proximity sensing may be performed.

Figure 1:
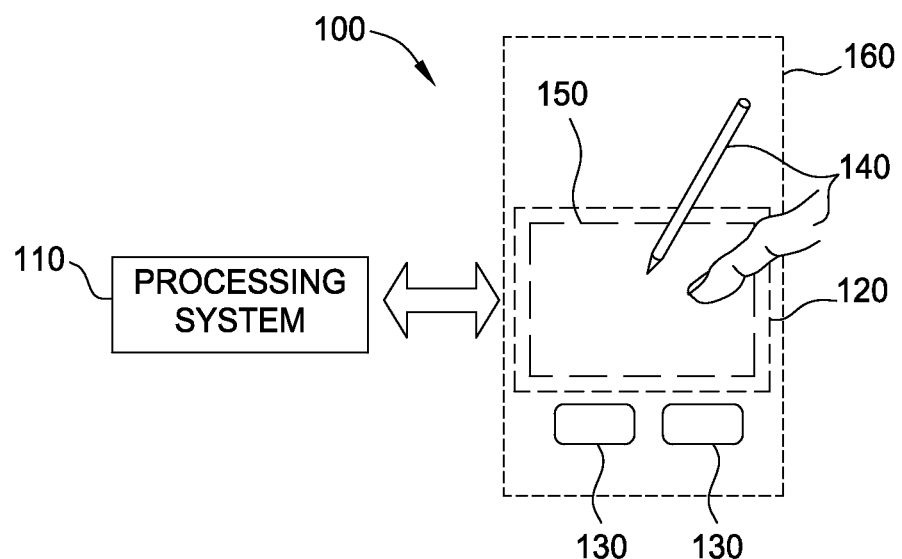
FIG. 1 is a block diagram of an exemplary input device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. The sensing region 120 may extend from a surface of the input device 100 in one or more directions into space until signal-to-noise ratios prevent sufficiently accurate object detection. In various embodiments, the sensing region 120 includes both a far-field sensing region and a near-filed sensing region that is disposed between the far-field sensing region and an input surface of the input device 100. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field in the sensing region 120 (e.g., near-field sensing region 122 and/or far-field sensing region 124). Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effects corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes and/or receiver electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In addition, the common electrodes may include other display elements, such as source drivers, gate select lines, storage capacitors, and the like, and such display elements may be used to perform capacitive sensing. In various embodiments, a transmitter electrode or receiver electrode may include one or more common electrodes. For example, multiple common electrodes (e.g., V-com electrodes or gate select lines) may be electrically coupled or otherwise combined to form a single transmitter electrode or receiver electrode. In other embodiments, two or more transmitter electrodes or receiver electrodes may share one or more common electrodes.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions, such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components (e.g., common electrodes) for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Far-Field Sensing with a Display Device Having an Integrated Sensing Device

Figure 2A:
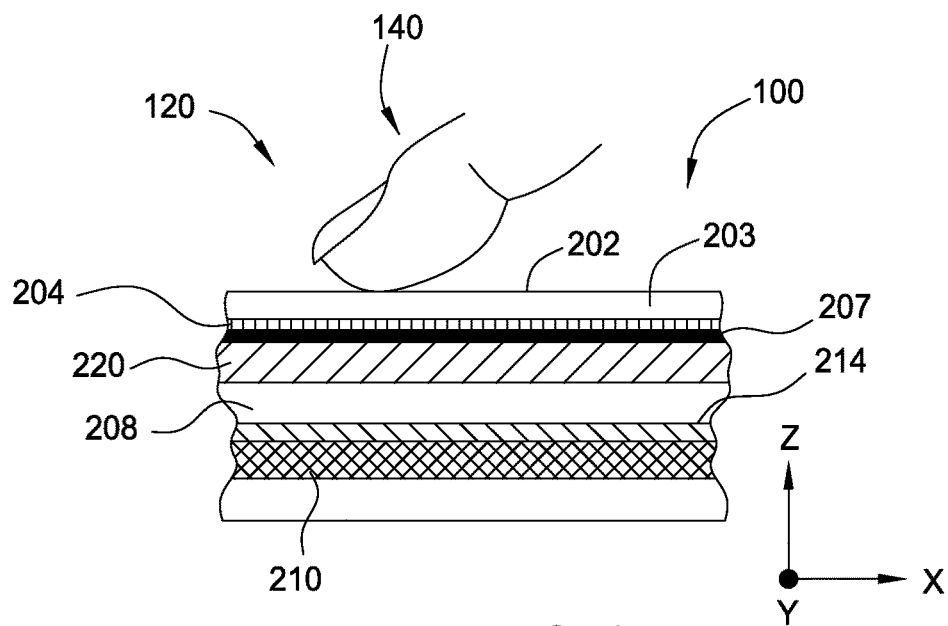
FIGS. 2A and 2B are partial schematic cross-sectional views of an embodiment of input device of FIG. 1.
Figure 2B:
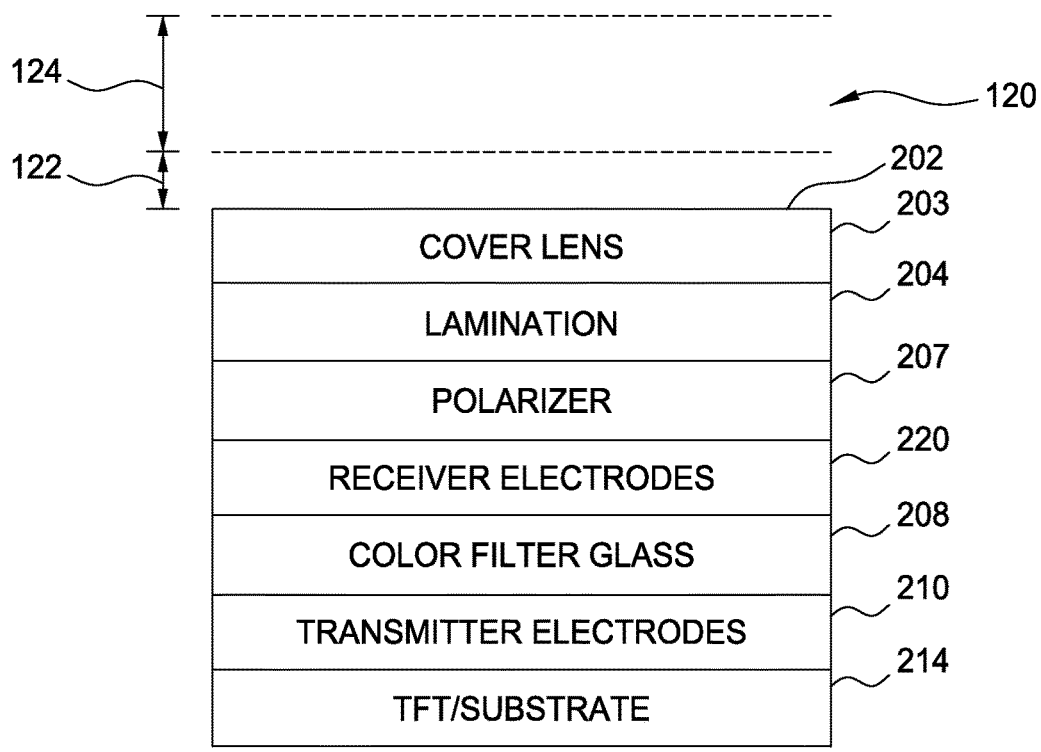

FIGS. 2A and 2B are partial schematic cross-sectional views of an embodiment of input device 100 of FIG. 1. In such an embodiment, the input device 100 includes an input surface 202 provided by a first substrate 203 disposed between the input object 140 and the sensor electrodes of the sensor assembly. The first substrate 203 may include a cover lens or window comprising a glass, plastic, or any other substantially transparent material. The sensor electrodes include a plurality of receiver electrodes 220 and a plurality of transmitter electrodes 210 for sensing the input object 140. The input device 100 further includes an optional lamination layer 204, a polarizer 207, a color filter glass 208, and a second substrate 214. In one embodiment, the second substrate is an active layer comprising the switching and driving circuitry (e.g., thin-film transistors (TFTs)) as well as the field-effect display materials, such as liquid crystal (LC), organic light emitting diodes (OLED), or other display materials.

As shown in FIG. 2B, the sensing region 120 may include both a near-field sensing region 122 and a far-field sensing region 124. The near-field sensing region 122 is disposed between the far-field sensing region 124 and the input surface 202 of the input device 100. In various embodiments, the near-field sensing region 122 may represent a region of space and/or a surface (e.g., input surface 202) in/on which touch sensing is performed, and the far-field sensing region 124 may represent a region of space in which proximity sensing is performed. In such embodiments, the receiver electrodes may include near-field receiver electrodes that are configured to perform input sensing in the near-field sensing region 122 and far-field receiver electrodes that are configured to perform input sensing in the far-field sensing region 124.

Although FIG. 2B illustrates the near-field sensing region 122 and far-field sensing region 124 as distinct regions, in some embodiments, the boundaries of these regions may overlap or there may be a gap between the regions in which sensing is not performed. For example, in some embodiments, the far-field sensing region 124 may extend more closely to the input surface 202. In still other embodiments, the near-field sensing region 122 represents a surface of the input device 100 (e.g., input surface 202) on which touch sensing is performed, and the far-field sensing region 124 represents the region of space above the surface of the input device 100.

Although FIG. 2B illustrates a specific configuration of the input device 100, other configurations of the sensor electrodes, substrates, layers, etc. are contemplated. For example, in various embodiments, the receiver electrodes 220 may be disposed such that they are at a different location between the transmitter electrodes 210 and the input surface 202, such as between the lamination layer 204 and the polarizer 207. In other embodiments, the receiver electrodes 220 may be disposed on the input surface 202 or between the cover lens 203 and the lamination layer 204. In another embodiment, the receiver electrodes 220 may be disposed between the color filter glass 208 and the second substrate 214. In yet another embodiment, the transmitter electrodes 210 and the receiver electrodes 220 are disposed such that they are on the same layer or substrate. For example, the transmitter electrodes 210 and the receiver electrodes 220 may be disposed on the same side of the color filter glass 208 or on the same side of second substrate 214. In further embodiments, the input device 100 may include additional layers not shown, and at least a portion of the transmitter electrodes 210 and/or the receiver electrodes 220 may be disposed on one of the additional layers.

Figure 3A:
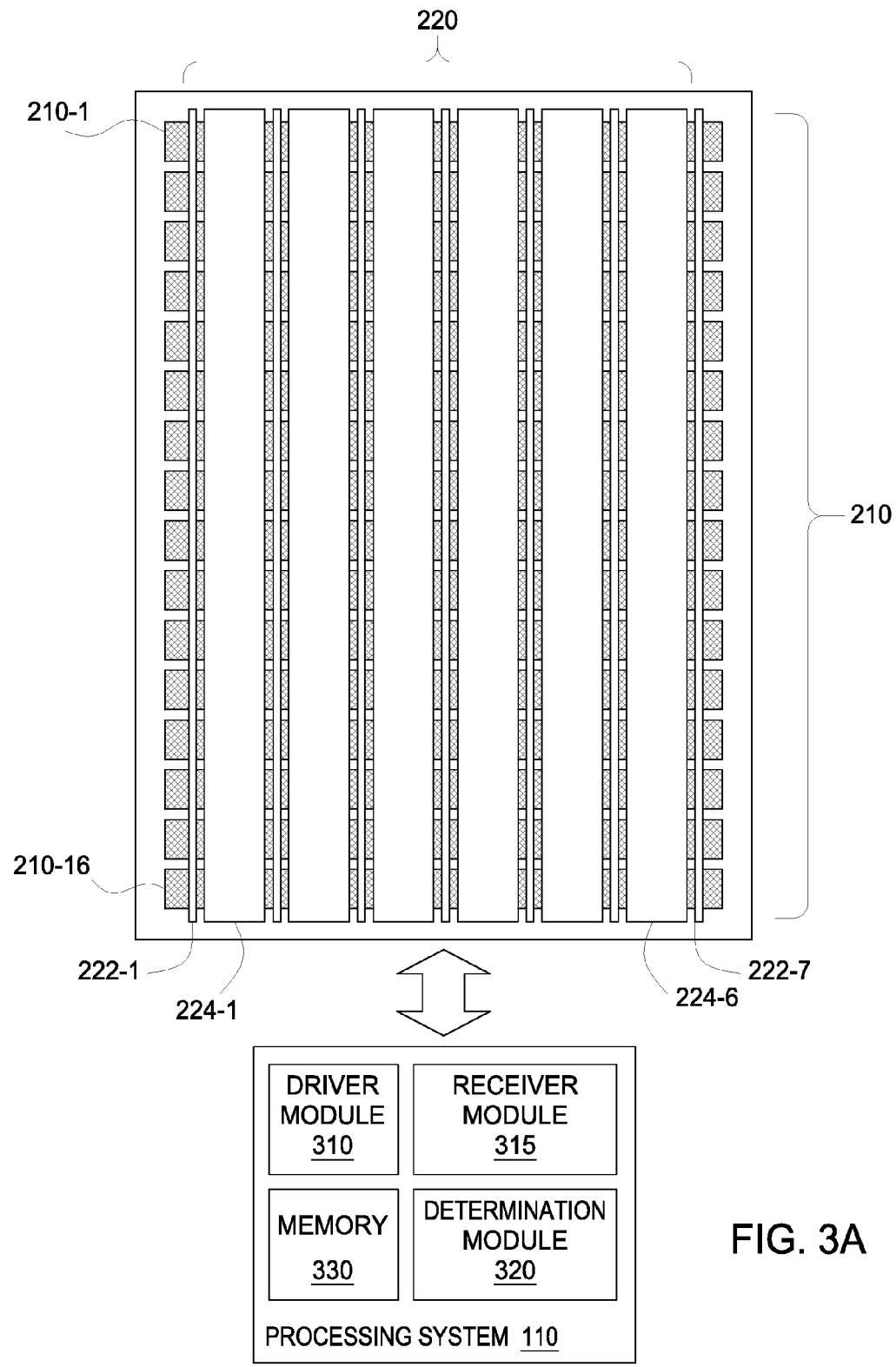
FIGS. 3A and 3B are partial schematic plan views of the input device of FIG. 1 in accordance with embodiments of the invention.
Figure 3B:
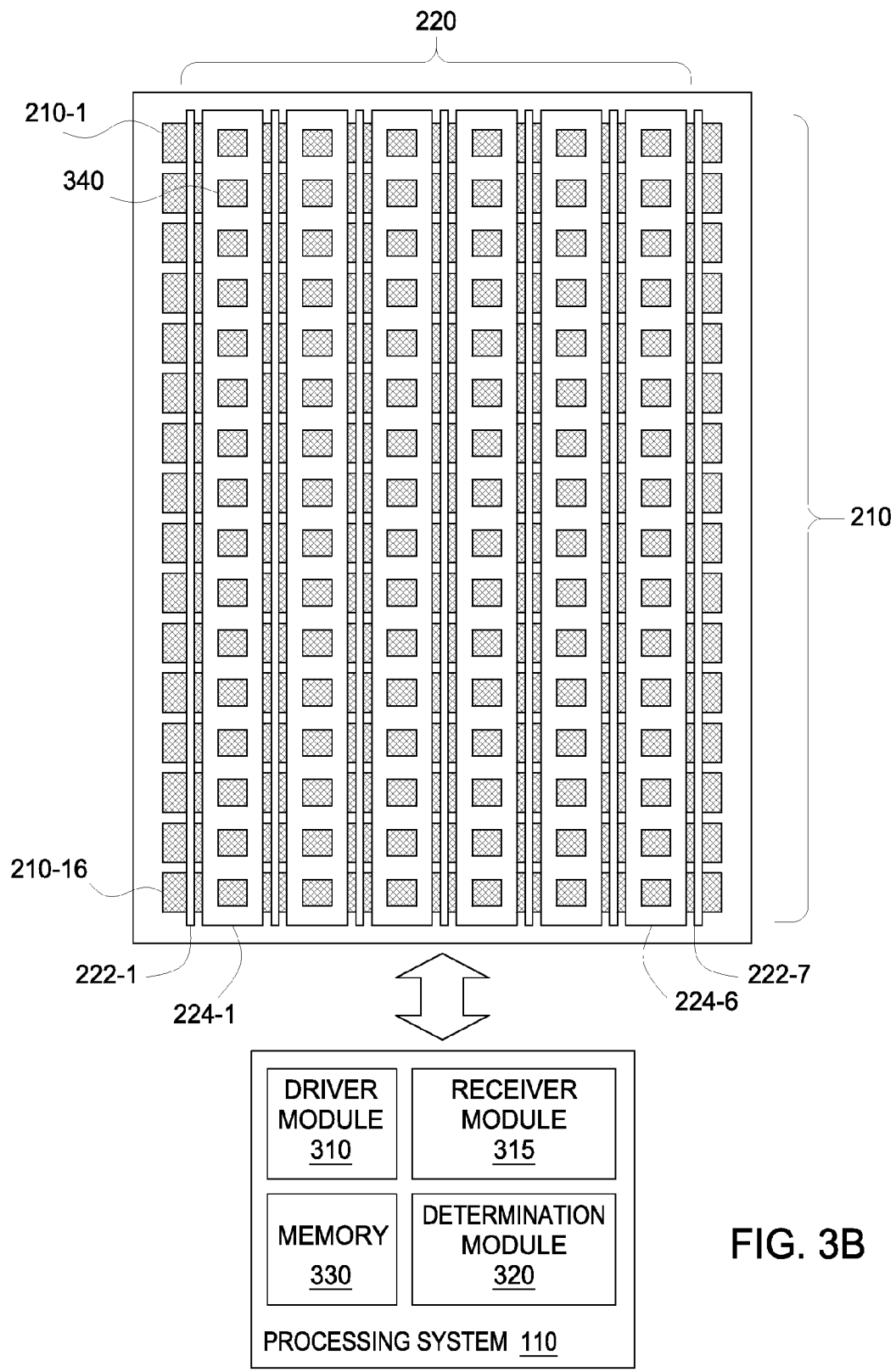

FIGS. 3A and 3B are partial schematic plan views of the input device 100 of FIG. 1 in accordance with embodiments of the invention. The input device 100 includes an array of sensing elements 150 and processing system 110. The array of sensing elements 150 includes a plurality of transmitter electrodes 210 (e.g., 210-1, 210-2, 210-3, etc.), and a plurality of receiver electrodes 220. The plurality of receiver electrodes 220 includes a plurality of near-field receiver electrodes 222 (e.g., 222-1, 222-2, 222-3, etc.) configured for sensing in the near-field sensing region 122 and a plurality of far-field receiver electrodes 224 (e.g., 224-1, 224-2, 224-3, etc.) configured for sensing in the far-field sensing region 124.

Each transmitter electrode 210 may comprise one or more common electrodes. Additionally, in various embodiments, each receiver electrode 220 may comprise one or more common electrodes. The processing system 110 is coupled to the array of sensing elements 150, for example, through one or more routing traces (not shown).

As shown in FIGS. 3A and 3B, the far-field receiver electrodes 224 may be wider and have a larger surface area and edge length than the near-field receiver electrodes 222. In general, the near-field receiver electrodes 222 cannot accurately detect a hovering input object 140 in the far-field sensing region 124. However, by using electrodes (i.e., far-field receiver electrodes 224) having an increased width, surface area, and/or edge length, the number of field lines and/or height of the field lines above the input surface 202 may be increased, enabling the electrodes to more accurately sense an input object 140 that is hovering above the input surface 202. One drawback to increasing the width and/or surface area of an electrode is that the far-field receiver electrodes 224 are more susceptible to finger-coupled interference and degraded performance in low ground mass conditions (e.g., when the input device 100 is poorly grounded). Thus, by including both near-field receiver electrodes 222 and far-field receiver electrodes 224, the input device 100 is capable of accurately performing both near-field sensing (e.g., touch sensing) and far-field sensing (e.g., proximity sensing). In general, near-field receiver electrodes 222 and far-field receiver electrodes 224 having any geometric shapes may be used so long as the electrodes include the beneficial electrical attributes described above. For example, in other embodiments, the far-field receiver electrodes 224 are diamond-shaped, and the near-field receiver electrodes 222 are disposed around the periphery of the far-field receiver electrodes 224 (e.g., in a zigzag pattern).

In other embodiments, instead of modifying the width of the far-field receiver electrodes 224 relative to the near-field receiver electrodes 222, a different geometric property of the electrodes may be modified so that the far-field receiver electrodes 224 are more capable of performing proximity sensing than the near-field receiver electrodes 222. For example, the far-field receiver electrodes 224 may be modified to include a greater number of prongs, additional cutouts, and/or protrusions/extensions configured to increase the edge length of the far-field receiver electrodes 224 and, thus, the number of field lines coupling the far-field electrodes 224 to the transmitter electrodes 210. In addition, any of these modifications may be configured to increase the height of the field lines that are projected from the transmitter electrodes 210 above the input surface 202.

In some embodiments, the near-field receiver electrodes 222 and the far-field receiver electrodes 224 are disposed on the same layer or substrate of the input device 100. For example, both the near-field receiver electrodes 222 and the far-field receiver electrodes 224 may be disposed on any of the layers or substrates of the input device 100 described above with respect to the receiver electrodes 220 of FIG. 2B. In such embodiments, the far-field receiver electrodes 224 may be formed from the material that is left over after fabricating the near-field receiver electrodes 222. For example, a layer of transparent conductive material (e.g., transparent conductive oxide (TCO), such as indium tin oxide (ITO)) may be deposited on a substrate or layer included in the input device 100, and the near-field receiver electrodes 222 may be patterned in the deposited TCO layer. The far-field receiver electrodes 224 may then be fabricated from the "islands" of TCO that are left over after patterning the near-field receiver electrodes 222. Thus, the pattern of the far-field receiver electrodes 224 may be contoured to the pattern of the near-field receiver electrodes 222 such that the patterns are complementary. Consequently, the number of processing steps required to fabricate the receiver electrodes 220 may be reduced, since the far-field receiver electrodes 224 are fabricated at substantially the same time as the near-field receiver electrodes 222. In addition, when the pattern of the far-field receiver electrodes 224 is complementary to the pattern of the near-field receiver electrodes 222, as shown in FIGS. 3A and 3B, light transmissivity is substantially uniform over the plane on which the receiver electrodes 220 are disposed, resulting in uniform optical performance.

In other embodiments, the near-field receiver electrodes 222 and the far-field receiver electrodes 224 are disposed on different layers or substrates of the input device 100. For example, the near-field receiver electrodes 222 may be disposed on one of the layers or substrates described above with respect to FIG. 2B, and the far-field receiver electrodes 224 may be disposed on a different layer or substrate described above with respect to FIG. 2B. In one embodiment, the near-field receiver electrodes 222 are common electrodes and the far-field receiver electrodes 224 are disposed between the second substrate 214 and the color filter glass 208. In another embodiment, the near-field receiver electrodes 222 are common electrodes and the far-field receiver electrodes 224 are disposed between the cover lens 203 and the color filter glass 208.

Although the near-field receiver electrodes 222 and far-field receiver electrodes 224 are illustrated as being disposed in the input device 100 in an alternating manner (e.g., spatially interleaved), the near-field receiver electrodes 222 and far-field receiver electrodes 224 may be configured in other alternating or non-alternating patterns. For example, in other embodiments, the input device 100 may include twice as many near-field receiver electrodes 222 than far-field receiver electrodes 224. In such embodiments, a pattern of two consecutive near-field receiver electrodes 222 followed by one far-field receiver electrode 224, or another alternating or non-alternating, may be used. Additionally, in various embodiments, near-field receiver electrodes 222 may be positioned along the edges of the sensing region 120 to ensure that touch sensing performance is not compromised near the edges of the input device 100.

The processing system 110 may include a driver module 310, a receiver module 315, a determination module 320, and/or an optional memory 330. Although the processing system 110 is illustrated in FIGS. 3A and 3B as a single integrated circuit (IC), the processing system 110 may include any appropriate number of ICs. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

The driver module 310, which includes driver circuitry, may be configured for updating images on the display screen of the display device 160. For example, the driver circuitry may be configured to apply one or more pixel voltages to the display pixel electrodes through pixel source drivers. The driver circuitry may also be configured to apply one or more common drive voltages to the common electrodes to update one or more display lines of the display screen. In addition, the processing system 110 is configured to operate the common electrodes as transmitter electrodes for input sensing by driving transmitter signals onto the common electrodes.

The receiver module 315 is coupled to the plurality of receiver electrodes 220 and configured to receive resulting signals from the receiver electrodes 220 indicative of input (or lack of input) in the sensing region 120 and/or of environmental interference. The receiver module 315 may also be configured to pass the resulting signals to the determination module 320 for determining the presence of an input object and/or to the optional memory 330 for storage. In some embodiments, the near-field receiver electrodes 222 and the far-field receiver electrodes 224 may be coupled to different receiver modules 315 or may be coupled to the same receiver module 315 through different interfaces. In other embodiments, the near-field receiver electrodes 222 and the far-field receiver electrodes 224 may be coupled to a multiplexer, and the multiplexer may be coupled to the receiver module 315. In such embodiments, the multiplexer may be configured to switch between the near-field receiver electrodes 222 and the far-field receiver electrodes 224 in an alternating manner. For example, the multiplexer may be configured to receive resulting signals from the near-field receiver electrodes 222 during a first time period and receive resulting signals from the far-field receiver electrodes 224 during a second time period.

The determination module 320 may be used to process input sensing data (e.g., resulting signals) and determine one or more capacitive images related to positional information of an input object 140. In various embodiments, the determination module 320 determines positional information by comparing different types of sensing frames with measured interference, an appropriate differential image, and/or a baseline image to produce an interference free delta image.

Transmitter electrodes 210 and receiver electrodes 220 are ohmically isolated from each other by one or more insulators or air gaps which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220.

In some embodiments, the sensor pattern is "scanned" to determine these capacitive couplings. That is, the transmitter electrodes 210 are driven to transmit transmitter signals. Transmitters may be operated such that one transmitter electrode 210 transmits at one time, or multiple transmitter electrodes 210 transmit at the same time. Where multiple transmitter electrodes 210 transmit simultaneously, these multiple transmitter electrodes 210 may transmit the same transmitter signal and effectively produce an effectively larger transmitter electrode 310, or these multiple transmitter electrodes 210 may transmit different transmitter signals. For example, multiple transmitter electrodes 210 may transmit different transmitter signals according to one or more coding schemes that enable their combined effects on the resulting signals of receiver electrodes to be independently determined.

The receiver electrodes 220 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Figure 4:
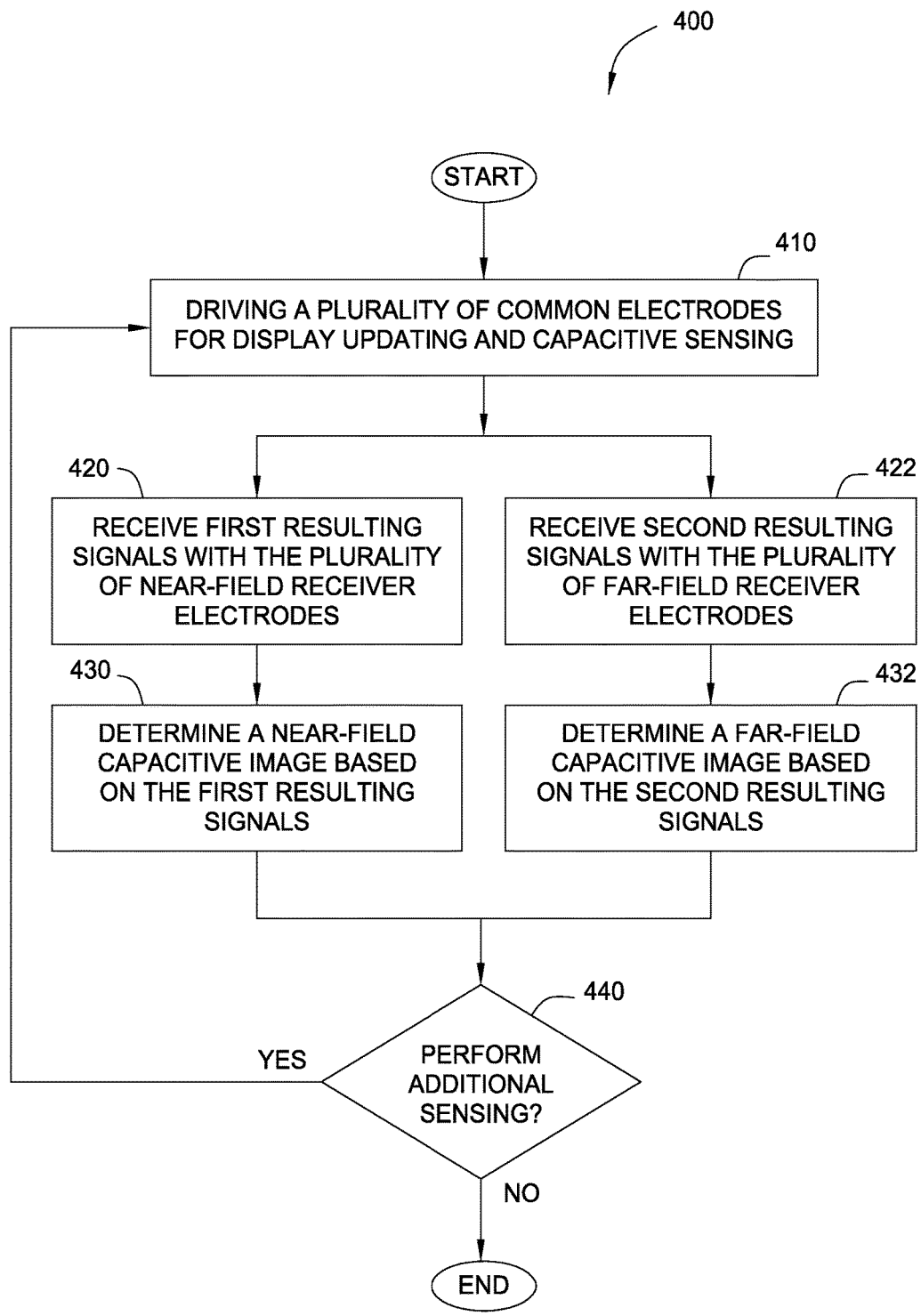
FIG. 4 is a flow chart of a method of capacitive sensing with a display device integrated with a capacitive sensing device having a plurality of common electrodes in accordance with embodiments of the invention.

FIG. 4 is a flow chart of a method 400 of capacitive sensing with a display device integrated with a capacitive sensing device having a plurality of common electrodes in accordance with embodiments of the invention. Although the method 400 is described in conjunction with FIGS. 1-3B, persons skilled in the art will understand that any system configured to perform the method, in any appropriate order, falls within the scope of the present invention.

The method 400 begins at step 410, where a plurality of common electrodes (e.g., transmitter electrodes 210) is driven for display updating and capacitive sensing. At step 420, first resulting signals are received with a plurality of near-field receiver electrodes 222, and, at step 422, second resulting signals are received with a plurality of far-field receiver electrodes 224 when the plurality of common electrodes are driven for capacitive sensing. In one embodiment, the first resulting signals are received by the near-field receiver electrodes 222 at the same time that the second resulting signals are received by the far-field receiver electrodes 224. In another embodiment, the first resulting signals and the second resulting signals are received in an alternating manner. For example, as described above with respect to FIGS. 3A and 3B, the near-field receiver electrodes 222 and the far-field receiver electrodes 224 may be coupled to the processing system 110 through a multiplexer, enabling the processing system 110 to switch between the near-field receiver electrodes 222 and the far-field receiver electrodes 224.

In various embodiments, the plurality of common electrodes may be driven in a different manner when performing sensing with the near-field receiver electrodes 222 (e.g., when receiving the first resulting signals) than when performing sensing with the far-field receiver electrodes 224 (e.g., when receiving the second resulting signals). For example, the signal(s) with which the common electrodes are driven when performing near-field sensing may have a different shape, frequency, and/or amplitude than the signal (s) with which the common electrodes are driven when performing far-field sensing. In one embodiment, the common electrodes may be driven with a boosted signal (e.g., overdrive signal) and/or driven between more than two voltages when performing far-field sensing. Additionally, the common electrodes may be driven for far-field sensing using a different coding technique than the coding technique used when driving the common electrodes for near-field sensing.

Next, at step 430, a near-field capacitive image is determined based on the first resulting signals, and, at step 432, a far-field capacitive image is determined based on the second resulting signals. In various embodiments, when determining the presence or location of an input object 140, the processing system 110 may determine whether the input object 140 is in both the near-field sensing region 122 and the far-field sensing region 124, or only in the far-field sensing region 124. If the processing system 110 determines that the input object 140 is in both the near-field sensing region 122 and the far-field sensing region 124, then the processing system 110 may use the near-field capacitive image in determining the presence or location of the input object 140. For example, if the processing system 110 determines that the input object 140 is in contact with the input surface 202, then the processing system 110 may use the near-field capacitive image and discard the far-field capacitive image. If, on the other hand, the processing system 110 determines that the input object 140 is in only the far-field sensing region 124, then the processing system 110 may use the far-field capacitive image in determining the presence or location of the input object 140. In another example, the processing system 110 may switch from performing capacitive sensing in the far-field sensing region 124 to performing capacitive sensing in the near-field sensing region 122 based on the second resulting signals received by the far-field receiver electrodes 224.

Finally, at step 440, the processing system determines whether additional input sensing is to be performed. If additional input sensing is to be performed, then the method 400 returns to step 410, where the common electrodes are again driven for capacitive sensing. If no additional input sensing it to be performed, then the method 400 ends.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. An input device comprising a display device integrated with a capacitive sensing device, the input device comprising:
a plurality of transmitter electrodes, each transmitter electrode comprising one or more common electrodes configured to be driven for display updating and capacitive sensing;
a plurality of near-field receiver electrodes configured to perform capacitive sensing in a near-field sensing region disposed between an input surface of the input device and a far-field sensing region;
a plurality of far-field receiver electrodes configured to perform capacitive sensing in the far-field sensing region, wherein a geometric property of a far-field receiver electrode included in the plurality of far-field receiver electrodes is different than the geometric property of a near-field receiver electrode included in the plurality of near-field receiver electrodes; and
a processing system coupled to the plurality of transmitter electrodes, the plurality of near-field receiver electrodes, and the plurality of far-field receiver electrodes, the processing system configured to:
drive the plurality of transmitter electrodes for capacitive sensing;
receive first resulting signals with the plurality of near-field receiver electrodes when the plurality of transmitter electrodes are driven for capacitive sensing;
determine a near-field capacitive image based on the first resulting signals;
receive second resulting signals with the plurality of far-field receiver electrodes when the plurality of transmitter electrodes are driven for capacitive sensing; and
determine a far-field capacitive image based on the second resulting signals.

2. The input device of claim 1, wherein the geometric property is an electrode width, and the electrode width of the far-field receiver electrode included in the plurality of far-field receiver electrodes is greater than the electrode width of a near-field receiver electrode included in the plurality of near-field receiver electrodes.

3. The input device of claim 1, wherein the plurality of far-field receiver electrodes are spatially interleaved with the plurality of near-field receiver electrodes.

4. The input device of claim 1, wherein the plurality of near-field receiver electrodes are associated with a first pattern, and the plurality of far-field receiver electrodes are associated with a second pattern that is complementary to the first pattern.

5. The input device of claim 1, wherein the processing system is further configured to switch from performing capacitive sensing in the far-field sensing region to performing capacitive sensing in the near-field sensing region in response to the second resulting signals.

6. The input device of claim 1, wherein the processing system is coupled to the plurality of near-field receiver electrodes and the plurality of far-field receiver electrodes via one or more multiplexers.

7. The input device of claim 1, wherein the plurality of near-field receiver electrodes and the plurality of far-field receiver electrodes are disposed on a first substrate of the input device.

8. The input device of claim 1, wherein the plurality of near-field receiver electrodes are disposed on a first substrate of the input device, and the plurality of far-field receiver electrodes are disposed on a second substrate of the input device.

9. The input device of claim 1, wherein the plurality of near-field receiver electrodes comprise one or more common electrodes, and the plurality of far-field receiver electrodes are disposed between a thin-film transistor substrate of the input device and a color filter glass of the input device.

10. The input device of claim 1, wherein the plurality of near-field receiver electrodes comprise one or more common electrodes, and the plurality of far-field receiver electrodes are disposed between a cover lens of the input device and a color filter glass of the input device.

11. The input device of claim 1, wherein the processing system is configured to simultaneously receive the first resulting signals and the second resulting signals.

12. The input device of claim 1, wherein the processing system is configured to receive the first resulting signals and the second resulting signals in an alternating manner.

13. A processing system for a display device integrated with a capacitive sensing device comprising:
a driver module comprising driver circuitry, the driver module coupled to a plurality of common electrodes configured to be driven for display updating and capacitive sensing;
a receiver module coupled to a plurality of near-field receiver electrodes and a plurality of far-field receiver electrodes, wherein a geometric property of a far-field receiver electrode included in the plurality of far-field receiver electrodes is different than the geometric property of a near-field receiver electrode included in the plurality of near-field receiver electrodes, the receiver module configured for:
receiving first resulting signals with the plurality of near-field receiver electrodes when the plurality of common electrodes are driven for capacitive sensing, wherein the plurality of near-field receiver electrodes are configured for performing capacitive sensing in a near-field sensing region disposed between an input surface of the capacitive sensing device and a far-field sensing region; and
receiving second resulting signals with the plurality of far-field receiver electrodes when the plurality of common electrodes are driven for capacitive sensing, wherein the plurality of far-field receiver electrodes are configured for performing capacitive sensing in the far-field sensing region; and
a determination module configured for:
determining a near-field capacitive image based on the first resulting signals; and
determining a far-field capacitive image based on the second resulting signals.

14. The processing system of claim 13, wherein the geometric property is an electrode width, and the electrode width of the far-field receiver electrode included in the plurality of far-field receiver electrodes is greater than the electrode width of a near-field receiver electrode included in the plurality of near-field receiver electrodes.

15. The processing system of claim 13, wherein the plurality of far-field receiver electrodes are spatially interleaved with the plurality of near-field receiver electrodes.

16. The processing system of claim 13, wherein the receiver module is further configured for switching from performing capacitive sensing in the far-field sensing region to performing capacitive sensing in the near-field sensing region in response to the second resulting signals.

17. The processing system of claim 13, further comprising one or more multiplexers configured to switch the receiver module between the plurality of near-field receiver electrodes and the plurality of far-field receiver electrodes.

18. The processing system of claim 13, wherein the processing system is configured to simultaneously receive the first resulting signals and the second resulting signals.

19. The processing system of claim 13, wherein the processing system is configured to receive the first resulting signals and the second resulting signals in an alternating manner.

20. A method of capacitive sensing with a display device integrated with a capacitive sensing device having a plurality of common electrodes, a plurality of near-field receiver electrodes, and a plurality of far-field receiver electrodes, wherein a geometric property of a far-field receiver electrode included in the plurality of far-field receiver electrodes is different than the geometric property of a near-field receiver electrode included in the plurality of near-field receiver electrodes, the method comprising:
driving the plurality of common electrodes for display updating and capacitive sensing;
receiving first resulting signals with the plurality of near-field receiver electrodes when the plurality of common electrodes are driven for capacitive sensing, wherein the plurality of near-field receiver electrodes are configured to perform capacitive sensing in a near-field sensing region disposed between an input surface of the input device and a far-field sensing region;
determining a near-field capacitive image based on the first resulting signals;
receiving second resulting signals with the plurality of far-field receiver electrodes when the plurality of common electrodes are driven for capacitive sensing, wherein the plurality of far-field receiver electrodes are configured to perform capacitive sensing in the far-field sensing region; and
determining a far-field capacitive image based on the second resulting signals.

21. The method of claim 20, further comprising switching from performing capacitive sensing in the far-field sensing region to performing capacitive sensing in the near-field sensing region in response to the second resulting signals.

22. The method of claim 20, wherein the first resulting signals and the second resulting signals are received simultaneously.

23. The method of claim 20, wherein the first resulting signals and the second resulting signals are received in an alternating manner.

* * * * *